United States Patent
Ho et al.

(10) Patent No.: US 9,505,174 B2
(45) Date of Patent: Nov. 29, 2016

(54) PRINTING HEAD MODULE

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Kwan Ho, New Taipei (TW); Yu-Chuan Chang, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 35 days.

(21) Appl. No.: 14/203,590

(22) Filed: Mar. 11, 2014

(65) Prior Publication Data

US 2015/0165677 A1    Jun. 18, 2015

(30) Foreign Application Priority Data

Dec. 13, 2013    (TW) .............................. 102146225 A

(51) Int. Cl.
    *B29C 67/00*    (2006.01)
    *B33Y 10/00*    (2015.01)
    *B33Y 30/00*    (2015.01)

(52) U.S. Cl.
    CPC ....... *B29C 67/0085* (2013.01); *B29C 67/0055* (2013.01); *B33Y 10/00* (2014.12); *B33Y 30/00* (2014.12)

(58) Field of Classification Search
    CPC .......... B29C 67/0088; B29C 67/0066; B29C 67/0092; B29C 35/08; B29C 39/42; B44B 1/00; B44C 1/04; C08F 2/00; C08F 2/46; C08F 2/48; C08G 85/00
    See application file for complete search history.

(56) References Cited

U.S. PATENT DOCUMENTS

| | | | |
|---|---|---|---|
| 5,037,218 A * | 8/1991 | Shimizu et al. ............... | 400/237 |
| 7,730,850 B2 * | 6/2010 | Khoury et al. ............... | 118/668 |
| 2001/0030383 A1 * | 10/2001 | Swanson ................. | B29C 41/36 264/308 |
| 2004/0004303 A1 * | 1/2004 | Iskra ............................. | 264/109 |
| 2014/0265040 A1 * | 9/2014 | Batchelder .................... | 264/409 |

* cited by examiner

*Primary Examiner* — Jacob Thomas Minskey
(74) *Attorney, Agent, or Firm* — Jianq Chyun IP Office

(57) ABSTRACT

A printing head module including a body, a feeding roller assembly and a feeding sensor is provided. The body includes a material-supplying channel and a nozzle connected to the material-supplying channel. The feeding roller assembly is disposed at the material-supplying channel to transmit the modeling material to the nozzle. The feeding sensor is disposed at the feeding roller assembly to detect whether the feeding roller assembly rotates. The feeding sensor is coupled to a control unit, such that the control unit generates a notice according to a detection result of the feeding sensor.

15 Claims, 3 Drawing Sheets

PRINTING HEAD MODULE

CROSS-REFERENCE TO RELATED APPLICATION

This application claims the priority benefit of Taiwan application serial no. 102146225, filed on Dec. 13, 2013. The entirety of the above-mentioned patent application is hereby incorporated by reference herein and made a part of this specification.

BACKGROUND

Technical Field

The technical field relates to a printing head module, and more particularly to a printing head module capable of sensing jam.

Description of Related Art

With advancement in computer-aided manufacturing (CAM), a three dimensional printing technology (3-D printing technology) has been developed in the manufacturing industry, which can very quickly fabricate a physical solid object based on an original concept design. The 3-D printing, in fact, is a general term of a series of rapid prototyping technologies (RP technologies) and the basic principle thereof, and the concept thereof is a laminate manufacturing, where an RP machine scans a prototype work piece along an X-Y plane to obtain a cross-section shape of the work piece. Meanwhile, the probe intermittently displaces in Z coordinate with a step of a slice thickness layer by layer so as to ultimately form the 3-D object. The 3-D printing is unrestricted for the geometric shapes with the prototype, and the more complex the work piece is, the more excellences the RP technology shows so as to largely save the labor and the process time. As a result, a digital 3-D model given by the computer-aided design (CAD) can be truthfully revealed under a shortest time requirement, and the model is, not only palpable, but also truly felt for its geometric curves. The user can trial the assembling performance of the model, and even can do possible functional test thereof.

At present, most of the 3-D printing apparatuses that utilize the aforementioned RP method to form 3-D objects transport a hot melt wire material to a melting nozzle by a feed material mechanism, and then heat and melt the hot melt wire material through the melting nozzle to apply the hot melt wire material layer by layer on a base, thereby forming the 3-D object. Generally, when the 3-D printing apparatus is feeding materials, the hot melt wire material is likely to get stuck between rollers of the feed material mechanism due to the size and property differences between the mechanical structure and the hot melt wire material, causing the fed hot melt wire material to be jammed or leading to the occurrence that the feed material mechanism idles when the hot melt wire material is used up. The 3-D printing is interrupt when the above situations take place, and the user has to disassemble the 3-D printing apparatus to check the inner part of the 3-D printing apparatus in order to know whether the hot melt wire material needs to be supplemented or there is a jammed material to be removed. Therefore, it is still inconvenient and takes a lot of time and labor when the current 3-D printing apparatus needs a replacement or maintenance.

SUMMARY

One of exemplary embodiments provides a printing head module which may detect a current material-supplying status and generate a corresponding notice.

In one of exemplary embodiments, the printing head module includes a body, a feeding roller assembly and a feeding sensor. The body includes a material-supplying channel and a nozzle connected to the material-supplying channel. The feeding roller assembly is disposed at the material-supplying channel to transmit a modeling material to the nozzle. The feeding sensor is disposed beside the feeding roller assembly for detecting whether the feeding roller assembly rotates. The feeding sensor is coupled to a control unit, such that the control unit generates a corresponding notice according to a detecting result of the feeding sensor.

In one of exemplary embodiments, the printing head module includes a body, a feeding roller assembly, a modeling material sensor, and a feeding sensor. The body includes a material-supplying channel and a nozzle. The material-supplying channel is connected to the nozzle. The feeding roller assembly is disposed at the material-supplying channel to transmit the modeling material to the nozzle. The modeling material sensor is disposed on a transmitting path of the modeling material to detect whether the modeling material passes through. The feeding sensor is disposed at the feeding roller assembly to detect whether the feeding roller assembly rotates. The modeling material sensor and the feeding sensor are coupled to a control unit. The control unit generates a corresponding notice according to a detecting result of the modeling material sensor and the feeding sensor.

Based on the above, the modeling material sensor is disposed on the transmitting path of the modeling material to detect whether the modeling material passes through a sensing area of the modeling material sensor, and the feeding sensor is disposed at the feeding roller assembly to detect whether the feeding roller assembly rotates. Accordingly, the control unit coupled to the modeling material sensor and the feeding sensor determines the current material supplying status of the 3-D printing apparatus based on the detecting result of the modeling material sensor and the feeding sensor and generates a corresponding notice accordingly. Therefore, a user may easily know whether the 3-D printing apparatus currently needs a replacement of the modeling material or a removal of jam without disassembling the 3-D printing apparatus, which improves convenience in replacement and maintenance for the 3-D printing apparatus and further saves the time for the replacement and maintenance.

In order to make the aforementioned features and advantages of the disclosure more comprehensible, embodiments accompanying figures are described in detail below.

DESCRIPTION OF EMBODIMENTS

The above-mentioned or other relevant technical principles and the features and effects thereof are clearly presented together with the accompanying drawings in the following depicted embodiments. Note that some of expression words hereinafter regarding direction or orientation, such as 'up', 'down', 'front', 'behind', 'left', 'right', and the like, are directions for references in the attached drawings which are to describe, not to limit, the present embodiment. In addition, in the following embodiments, a same notation or a similar notation is for marking the same or the similar portion.

Figure 1:
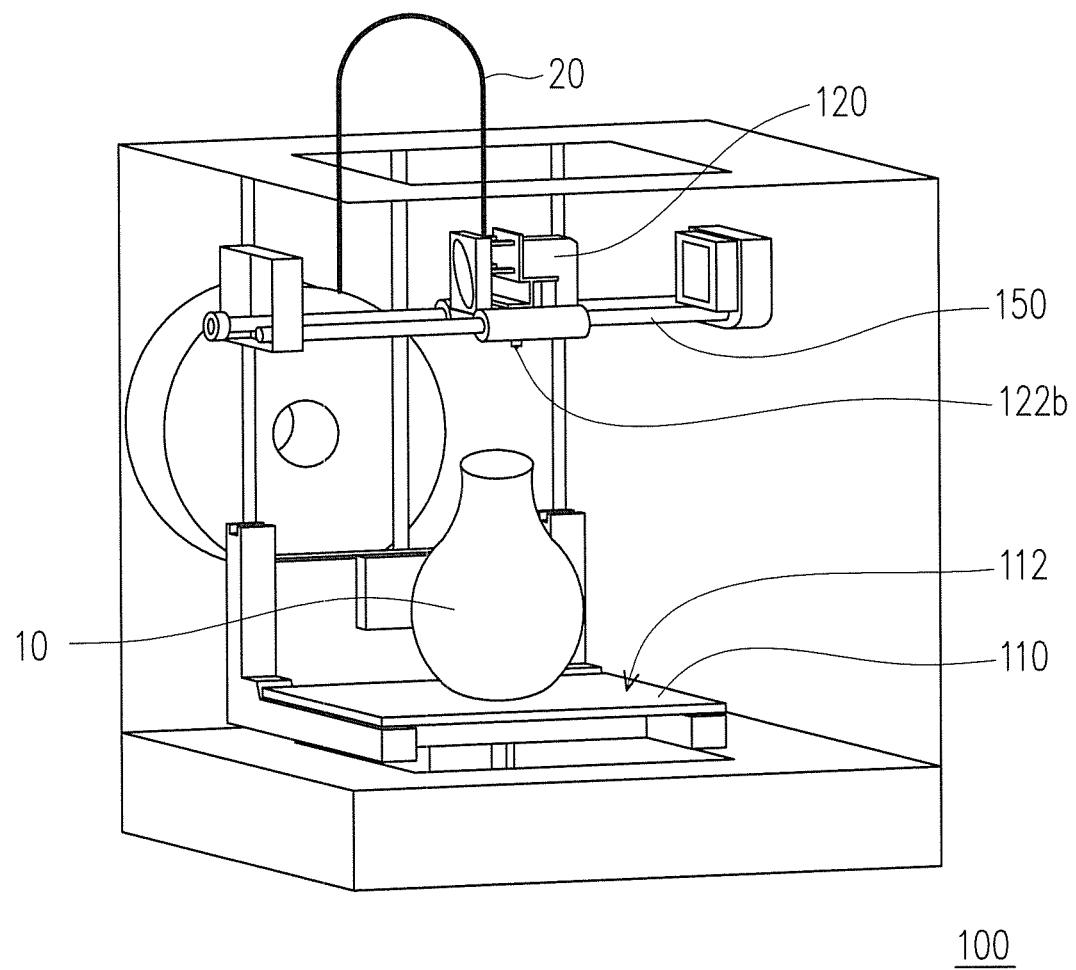
FIG. 1 is a schematic view illustrating a 3-D printing apparatus according to an exemplary embodiment.
Figure 2:
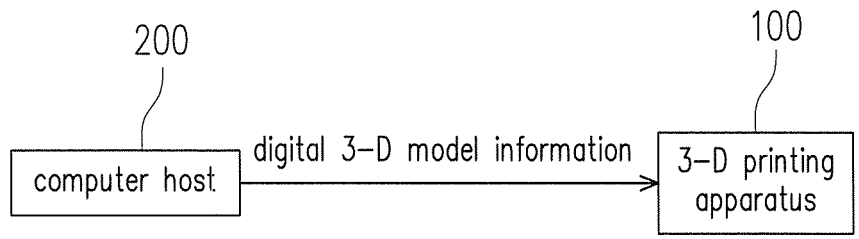
FIG. 2 is a schematic block view illustrating an in-use context of a 3-D printing apparatus according to exemplary embodiment.

FIG. 1 is a schematic view illustrating a 3-D printing apparatus according to an exemplary embodiment. FIG. 2 is a schematic block view illustrating an in-use context of a 3-D printing apparatus according to an exemplary embodiment. Please refer to both FIGS. 1 and 2. In the embodiment, a printing head module 120 is applicable for a 3-D printing apparatus 100 as shown in FIG. 1 and FIG. 2, wherein the 3-D printing apparatus 100 is capable of printing a 3-D object 10 according to a digital 3-D model information. The 3-D printing apparatus 100 may include a base 110, a printing head module 120, and a control unit 130. In the embodiment, the control unit 130 is configured to read the digital 3-D model information, wherein the digital 3-D model information may be a digital 3-D image file which is, for example, built by a computer host 200 through computer-aided design (CAD) or animation modeling software.

Based on the above, the base 110 of the 3-D printing apparatus 100 has a carrying surface 112 as shown in FIG. 1 for carrying a modeling material provided by the printing head module 120. The printing head module 120 is movably disposed above the base 110 and configured to slide back and forth along a slide rail 150. The base 110 may, for example, move in parallel with and relative to the printing head module 120. The control unit 130 coupled to the printing head module 120 is configured to read and process the digital 3-D model information. Accordingly, the control unit 130 controls the printing head module 120 to move along the slide rail 150 according to the digital 3-D model information, and the printing head module 120 may dispense the modeling material on the carrying surface 112 layer by layer to form a plurality of modeling material layers when moving. The modeling material layers are stacked onto one another to form the 3-D object 10.

Figure 3:
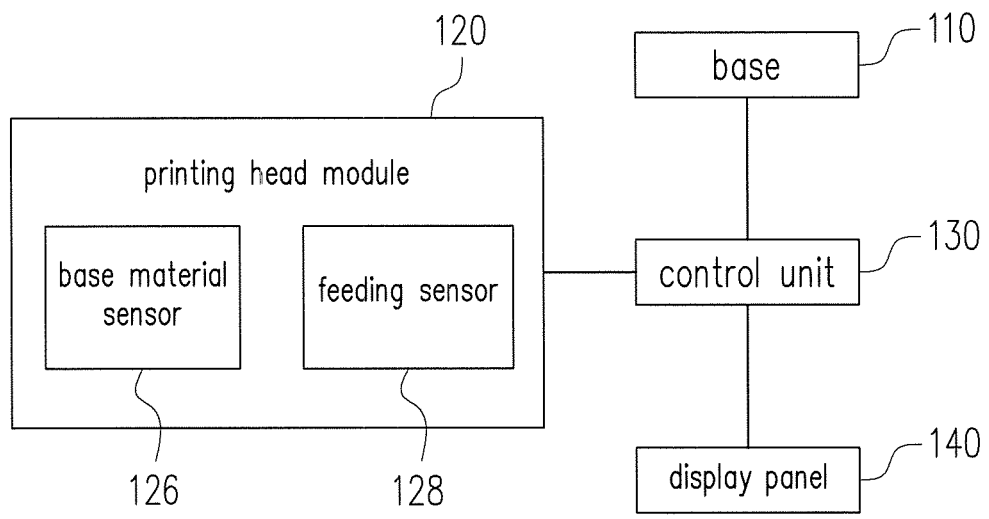
FIG. 3 is a schematic block view illustrating a 3-D printing apparatus according to an exemplary embodiment.
Figure 4:
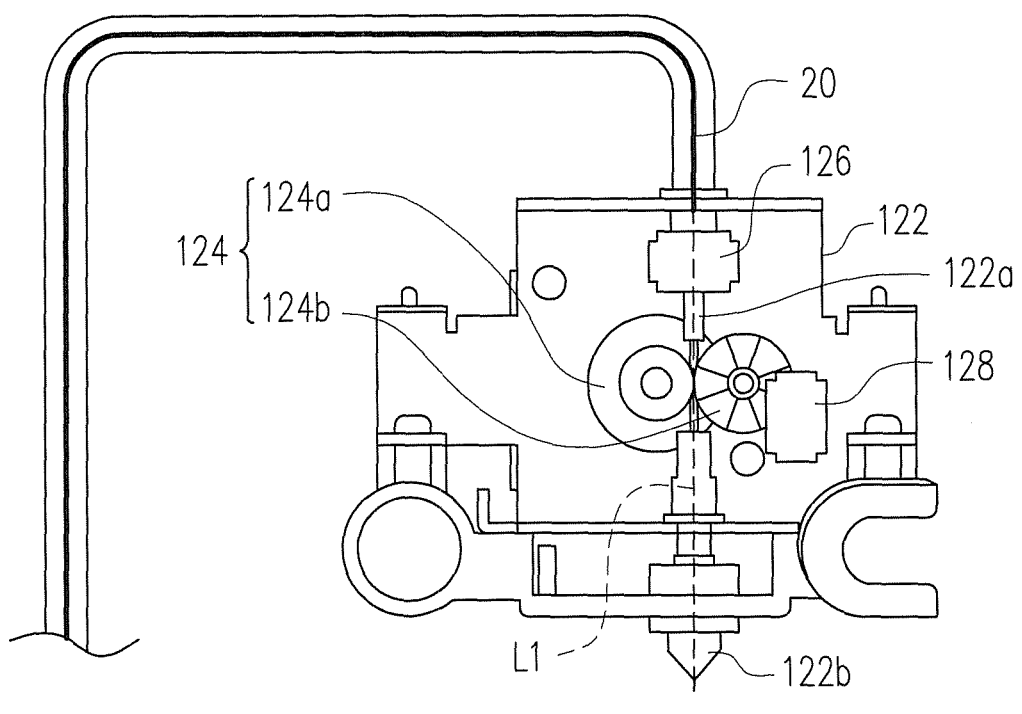
FIG. 4 is a sectional view illustrating a printing head module according to an exemplary embodiment.

FIG. 3 is a schematic block view illustrating a 3-D printing apparatus according to an exemplary embodiment. FIG. 4 is a sectional view illustrating a printing head module according to an exemplary embodiment. Specifically, referring to both FIG. 3 and FIG. 4, the printing head module 120 includes a body 122, a feeding roller assembly 124, and a feeding sensor 128. The body 122 includes a material-supplying channel 122a and a nozzle 122b, wherein the material-supplying channel 122a is connected to the nozzle 122b. Precisely, the material-supplying channel 122a and the nozzle 122b correspond to each other to form a material-supplying path L1. The feeding roller assembly 124 is disposed between the material-supplying channel 122a and the nozzle 122b to transmit a modeling material 20 to the nozzle 122b. The feeding sensor 128 is disposed beside the feeding roller assembly 124.

In the embodiment, the modeling material 20 may be various materials suitable for manufacturing methods such as stereolithography, a fused filament fabrication (FFF), melted and extrusion modeling, electron beam modeling and so on. For example, the modeling material 20 may be a hot melt filament suitable for manufacturing method of FFF, and the modeling material 20 is heated via, for example, the nozzle 122b of the printing head module 120 such that the modeling material 20 transmitted to the nozzle 122b is molten into fluid material in a molten status. Then, the molten modeling material is extruded out by the nozzle 122b and dispensed on the carrying surface 112 layer by layer to form a plurality of laminated modeling material layers, which are then, for example, cured or dried to form the 3-D object 10.

In the embodiment, the feeding sensor 128 is disposed at the feeding roller assembly 124 to detect whether the feeding roller assembly 124 rotates. Specifically, the feeding roller assembly 124 may include an active roller 124a and a passive roller 124b, which are respectively disposed at two opposite sides of the material-supplying path L1. The active roller 124a may be, for example, coupled to a motor which drives the active roller 124a to rotate, and then the active roller drives the passive roller 124b to rotate, such that the active roller and the passive roller 124b hold the modeling material 20 together to transmit the modeling material 20 to move along the material-supplying path L1. The feeding sensor 128 may be, for example, disposed at the passive roller 124b to detect whether the passive roller 124b rotates. In the embodiment, the feeding sensor 128 may be a rotation sensor, an inertial sensor, a magneto-inductive sensor, or a gyroscope, etc. It should be noted that persons having ordinary skill in the art should be aware of that there are various types of sensors; therefore, a designer may adopt various sensors as the modeling material sensor 126 and the feeding sensor 128 based on the requirement of design. In other words, the exemplary embodiment is not limited to the above possible implementations.

With such configuration, the feeding roller assembly 124 and the feeding sensor 128 are coupled to, for example, a control unit 130 of the 3-D printing apparatus 100, which enables the control unit 130 to drive the feeding roller assembly 124 to rotate so as to transmit the modeling material 20 from the material-supplying channel 122a to the nozzle 122b along the material-supplying path L1, such that the modeling material 20 is extruded via the nozzle 122b to form the 3-D object 10, and enables the control unit 130 to generate a corresponding notice according to the detecting result of the feeding sensor 128. For example, if the feeding sensor 128 detects that the feeding roller assembly 124 is rotating, it means that the feeding roller assembly 124 is rotating to transmit the modeling material; that is, the printing head module 120 is in a normal material-supplying status. At the time, the control unit 130 generates a notice indicating "material in normal supply" accordingly.

In addition, if the feeding sensor 128 detects that the feeding roller assembly 124 does not rotate, it means that the feeding roller assembly 124 does not rotate; that is, the feeding roller assembly 124 may be jammed; at the time, the control unit 130 may generate a notice indicating "material jammed" accordingly.

Moreover, in the embodiment, the active roller 124a or the passive roller 124b of the feeding roller assembly 124 may be a color wheel. The feeding sensor 128 detects whether the feeding roller assembly 124 rotates according to the sensed change of color. For instance, the active roller 124a or the passive roller 124b of the feeding roller assembly 124 may be a color wheel, which may be a black-and-white rolling wheel and the colors thereof are alternately arranged around 360 degrees as the passive roller 124b shown in FIG. 4. Accordingly, when the feeding roller assembly 124 rotates at a certain distance, the color (black or white) of the passive roller 124b detected by the feeding sensor 128 changes, and the feeding sensor 128 sends a signal to the control unit every time when the detected color (black or white) of the passive roller 124b changes. The control unit adds up the number of times that the feeding sensor 128 sends the signal to obtain the distance of the feeding roller assembly 124 has rotated accordingly. Moreover, the control unit acquires the number of the times that the feeding sensor 128 has sent the signal when the modeling material is fed in a certain length. Thereby, if the number of times of the feeding sensor 128 sending the signal is zero, it may suggest the occurrence of jamming; if the number of times of the feeding sensor 128 sending the signal is greater than zero, it means that the material supply is currently in a normal status. Certainly, in other embodiments, the active roller 124a may be the color wheel, and the feeding sensor 128 is disposed corresponding to the active roller 124a to detect whether the active roller 124a rotates.

In other embodiments, the printing head module 120 may further include a modeling material sensor 126. In the embodiment, the printing head module 120 transmits the modeling material 20 in the material-supplying channel 122a to the nozzle 122b along the material-supplying path L1 via the rotation of the feeding roller assembly 124. The modeling material sensor 126 is disposed next to the material-supplying path L1 to detect whether the modeling material 20 passes through. In the embodiment, the modeling material sensor 126 may be, for example, a photo sensor which determines whether the modeling material 20 passes through the sensing area of the modeling material sensor 126 based on whether a light beam is blocked or not. More specifically, the modeling material sensor 126 may be located right above the feeding roller assembly 124 to detect whether the modeling material 20 is transmitted to the feeding roller assembly 124. The feeding sensor 128 is disposed at the feeding roller assembly 124 to detect whether the feeding roller assembly 124 rotates. Precisely, the feeding roller assembly 124 may include an active roller 124a and a passive roller 124b, which are respectively disposed at two opposite sides of the material-supplying path L1. The active roller 124a may be, for example, coupled to a motor which drives the active roller 124a to rotate, and then the active roller drives the passive roller 124b to rotate such that the active roller and the passive roller 124b hold the modeling material 20 together to transmit the modeling material 20 to move along the material-supplying path L1.

Based on the above, the feeding sensor 128 may be, for example, disposed at the passive roller 124b to detect whether the passive roller 124b rotates. In the embodiment, the feeding sensor 128 may be a rotation sensor, an inertial sensor, a magneto-inductive sensor, a gyroscope, etc. It should be noted that persons having ordinary skill in the art should be aware of that there are various types of sensors; therefore, a designer may adopt a various sensors as the modeling material sensor 126 and the feeding sensor 128 based on the requirement of design. In other words, the exemplary embodiment is not limited to the above possible implementations.

With such configuration, the control unit 130 is coupled to the modeling material 126 and the feeding sensor 128 to generate a corresponding notice according to the detecting result of the modeling material sensor 126 and the feeding sensor 128. For example, if the modeling material sensor 126 detects that the modeling material 20 passes through, and the feeding sensor 128 detects that the feeding roller assembly 124 is rotating, it means that the modeling material 20 has arrived and the feeding roller assembly 124 is rotating to transmit the modeling material; that is, the 3-D printing apparatus 100 is in a normal material-supplying status; at the time, the control unit 130 may generate a notice indicating "material in normal supply" accordingly.

In addition, if the modeling material sensor 126 detects that the modeling material 20 passes through, and the feeding sensor 128 detects that the feeding roller assembly 124 is not rotating, it means that the modeling material 20 has arrived at the feeding roller assembly 124 but the feeding roller assembly 124 is not rotating; that is, the feeding roller assembly 124 may be jammed; at the time, the control unit may generate a notice indicating "material jammed" accordingly.

Moreover, if the modeling material sensor 126 detects that the modeling material 20 does not pass through the sensing area of the modeling material sensor 126, and the feeding sensor 128 detects that the feeding roller assembly 124 is rotating, it means that the modeling material 20 is running out; that is, the modeling material needs to be replaced as soon as possible. At the time, the control unit may generate a notice indicating "insufficient supply of material" and control the feeding roller assembly 124 to stop rotating.

Meanwhile, if the modeling material sensor 126 detects that the modeling material 20 does not pass through the sensing area of the modeling material sensor 126, and the feeding sensor 128 also detects that the feeding roller assembly 124 is not rotating, it means that the modeling material 20 is used up; that is, the modeling material needs to be replaced. At the time, the control unit may generate a notice indicating "out of material" accordingly.

In addition, in the embodiment, the active roller 124a or the passive roller 124b of the feeding roller assembly 124 may be a color wheel. The feeding sensor 128 detects whether the feeding roller assembly 124 rotates according to the sensed change of color. For example, the active roller 124a or the passive roller 124b of the feeding roller assembly 124 may be a color wheel, which may be a black-and-white rolling wheel and the colors thereof are alternately arranged around 360 degrees as the passive roller 124b shown in FIG. 4. Accordingly, when the feeding roller assembly 124 rotates at a certain distance, the color (black or white) of the passive roller 124b detected by the feeding sensor 128 changes, and the feeding sensor 128 sends a signal to the control unit every time when the detected color (black or white) of the passive roller 124b changes. The control unit adds up the number of times that the feeding sensor 128 sends the signal to obtain the distance of the feeding roller assembly 124 has rotated accordingly. Moreover, the control unit acquires the number of the times that the feeding sensor 128 has sent the signal when the modeling material is fed in a certain length. Thereby, if the number of times of the feeding sensor 128 sending the signal is zero, it may suggest the occurrence of jamming; if the number of times of the feeding sensor 128 sending the signal is greater than zero, it means that the material supply is currently in a normal status. Certainly, in other embodiments, the active roller 124a may be the color wheel, and the feeding sensor 128 is disposed corresponding to the active roller 124a to detect whether the active roller 124a rotates.

In the embodiment, the notice may be a notification sound. That is to say, the control unit 130 may generate corresponding and various notification sounds according to the detecting result of the modeling material sensor 126 and the feeding sensor 128 to notify the user the current material-supply status of the 3-D printing apparatus 100. Alternatively, the 3-D printing device 100 may include a plurality of notification lights so that the control unit 130 may light up a corresponding notification light according to the detecting result of the modeling material sensor 126 and the feeding sensor 128. Furthermore, in another embodiment, the 3-D printing apparatus 100 may further include a display panel 140 as shown in FIG. 3, and the notice may be a notification image. The display panel may display the notification image for a user to check the current material-supplying status of the 3-D printing apparatus 100. Certainly, persons having ordinary skill in the art should be aware of that the notice may be presented in many ways; therefore, designers may make modification or adjustment at their own discretion according to actual products. In other words, the exemplary embodiment is not limited to the above possible implementations.

In summary, in the exemplary embodiment of the 3-D printing apparatus and the printing head module thereof, the modeling material sensor is disposed on the transmitting path of the modeling material to detect whether the modeling material passes through the sensing area of the modeling material sensor, and the feeding sensor is disposed at the feeding roller assembly to detect whether the feeding roller assembly is rotating. Accordingly, the control unit coupled to the modeling material sensor and the feeding sensor may determine the current material-supplying status of the 3-D printing apparatus according to the detecting result of the modeling material sensor and the feeding sensor to generate a corresponding notice. Therefore, the user may easily know whether the 3-D printing apparatus currently needs a replacement of the modeling material or a removal of jam without disassembling the 3-D printing apparatus, which improves convenience in replacement and maintenance for the 3-D printing apparatus and further saves the time required for the replacement and maintenance.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A printing head module, capable of dispensing a modeling material layer by layer to form a three-dimensional (3-D) object, the printing head module comprising:
   a body, comprising a material-supplying channel and a nozzle, the material-supplying channel corresponding to the nozzle and forming a material-supplying path with the nozzle;
   a feeding roller assembly, disposed between the material-supplying channel and the nozzle, the feeding roller assembly comprising an active roller and a passive roller respectively disposed at two opposite sides of the material-supplying path;
   a feeding sensor, disposed at the passive roller to directly detect whether the passive roller rotates; and
   a control unit, coupled to the feeding roller assembly and the feeding sensor to control the active roller to drive the passive roller to rotate, so as to transmit the modeling material from the material-supplying channel to the nozzle along the material-supplying path, and the modeling material extruded out from the nozzle to form the 3-D object, and the control unit generating a notice according to a directly detecting result of the feeding sensor.

2. The printing head module as claimed in claim 1, wherein the control unit generates a "material jammed" notice when the feeding sensor detects that the feeding roller assembly does not rotate.

3. The printing head module as claimed in claim 1, wherein the control unit generates a "material in normal supply" notice when the feeding sensor detects that the feeding roller assembly rotates.

4. The printing head module as claimed in claim 1, wherein the feeding sensor comprises a rotation sensor.

5. The printing head module as claimed in claim 1, wherein the notice comprises a notification sound.

6. The printing head module as claimed in claim 1, further comprising a display panel, the notice comprising a notification image, the display panel displaying the notification image.

7. The printing head module according to claim 1, wherein the passive roller comprises a colored wheel having multiple colors alternately arranged, and the feeding sensor determines whether the passive roller rotates according to whether the color detected by the feeding sensor detects change of colors.

8. A printing head module, forming a modeling material into a three-dimensional (3-D) object, comprising:
   a body, comprising a material-supplying channel and a nozzle, the material-supplying channel corresponding to the nozzle and forming a material-supplying path with the nozzle;
   a feeding roller assembly, disposed between the material-supplying channel and the nozzle, the feeding roller assembly comprising an active roller and a passive roller respectively disposed at two opposite sides of the material-supplying path;
   a feeding sensor, disposed at the passive roller to directly detect whether passive roller rotates;
   a modeling material sensor, disposed beside the material-supplying path to detect whether the modeling material passes through; and
   a control unit, coupled to the feeding roller assembly, the feeding sensor and the modeling material sensor to control the active roller to drive the passive roller to rotate so as to transmit the modeling material from the material-supplying channel to the nozzle along material-supplying path, and the modeling material extruded out from the nozzle to form the 3-D object, and the control unit generating a corresponding notice according to a detecting result of the modeling material sensor and a directly detecting result of the feeding sensor.

9. The printing head module as claimed in claim 8, wherein when the modeling material sensor detects that the modeling material passes through, and the feeding sensor detects that the passive roller does not rotate, the control unit generates a "material jammed" notice accordingly.

10. The printing head module as claimed in claim 8, wherein, when the modeling material sensor detects that the modeling material does not pass through, and the feeding sensor detects that the passive roller is rotating, the control unit generates an "insufficient supply of material" notice.

11. The printing head module as claimed in claim 8, wherein, when the modeling material sensor detects that the modeling material does not pass through, and the feeding sensor detects that the passive roller does not rotate, the control unit generates a "out of material" notice.

12. The printing head module as claimed in claim 8, wherein, when the modeling material sensor detects that the modeling material passes through, and the feeding sensor detects that the passive roller is rotating, the control unit generates a "material in normal supply" notice.

13. The printing head module as claimed in claim 8, wherein the modeling material sensor comprises a photo sensor.

14. The printing head module according to claim 8, wherein the feeding sensor comprises a rotation sensor.

15. The printing head module according to claim 8, wherein the feeding roller assembly comprises a color wheel in multiple colors, and the feeding sensor detects whether the feeding roller assembly rotates according to a detected change of colors.

\* \* \* \* \*